2,522,328

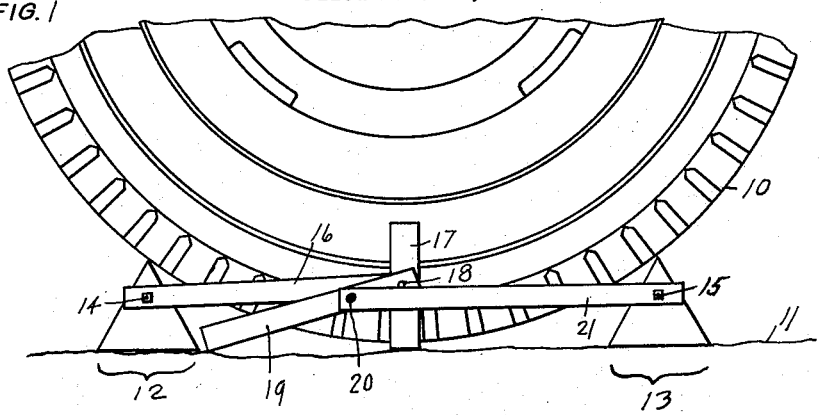
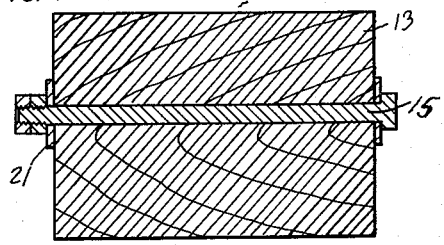
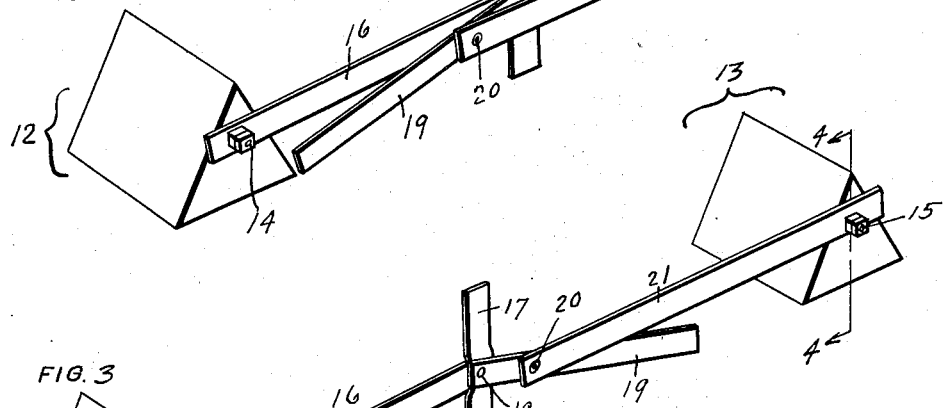
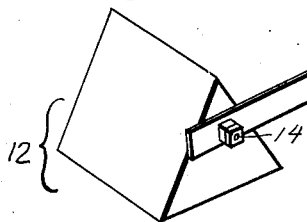
Sept. 12, 1950     A. M. WISWELL ET AL     2,522,328
WHEEL BLOCK
Filed Dec. 26, 1947
INVENTORS
A. M. WISWELL
M. O. REAM
ATTORNEY Patented Sept. 12, 1950

UNITED STATES PATENT OFFICE 2,522,328

WHEEL BLOCK

Arthur M. Wiswell and Merlyn O. Ream, Roseburg, Oreg.

Application December 26, 1947, Serial No. 793,998

2 Claims. (Cl. 188—32)

This invention relates generally to automobiles and particularly to a wheel block for use therewith.

The main object of this invention is to provide an inexpensive and efficient form of wheel block whereby a car may be held against movement in either direction.

The second object is to provide a wheel block which would prevent the dropping of an axle when being jacked up as is often the case when a car moves along the ground while one wheel is raised.

The third object is to provide a form of jack which will fit any ordinary wheel without any adjustment other than to turn the blocks to the proper positions.

We accomplish these and other objects in a manner set forth in the following specification as illustrated in the accompanying drawings, in which:

Fig. 1 is a side elevation of the device showing it in position under a wheel.

Fig. 2 is a perspective view of the device in the contracted position shown in Fig. 1.

Fig. 3 is a perspective view similar to Fig. 2 but showing the device in an extended position.

Like numbers of reference refer to the same or similar parts throughout the several views.

The device consists of the wheel blocks 12 and 13 which are triangular in cross section and large enough to effectively block the wheel 10 in either direction. The blocks 12 and 13 have extending through same the bolts 14 and 15 disposed on one side of the center of the end of the blocks 12 and 13.

To the bolt 14 we have attached the bar 16 on one end of which is secured a cross bar 17 by means of the rivet 18 to which is pivoted the operating lever 19 to which is attached by means of a rivet 20 the bar 21 which in turn is attached to the bolt 15.

The action of the device is quite simple. When it is desired to block a wheel 10 the lever 19 is first moved to the extended postion shown in Fig. 3 and a position of the blocks 12 and 13 selected which will bring them almost into engagement with the wheel 10.

The lever 19 is then moved to the position shown in Fig. 2 which brings the blocks 12 and 13 into close engagement with the wheel 10.

One end of the bar 17 rests upon the roadway 11 at all times in order to hold the rivet 18 above the rivet 20 while the free end of the lever 19 rests on the roadway 11. Thus the device can be inverted or placed end for end without detracting from its utility.

We claim:

1. A wheel block having in combination a pair of blocks of triangular cross section, said blocks having attached to the ends thereof a pair of bars, a handle having one end attached to one end of one bar and an intermediate part attached to the end of the opposite bar and a crossbar attached to one of said pair of bars serving to hold same above the other bar.

2. In a wheel block the combination of a pair of elongated blocks each having three ground engaging sides and parallel ends, an elongated bar hinged to one block and having a cross bar attached to its free end adapted to hold the end of the elongated bar above the roadway, a lever hinged to said cross bar, a second elongated bar hinged to said handle and to the second block.

ARTHUR M. WISWELL.
MERLYN O. REAM.

REFERENCES CITED

The following references are of record in the file of this patent:

UNITED STATES PATENTS

| Number | Name | Date |
|---|---|---|
| 472,997 | Hayward | Apr. 19, 1892 |
| 866,474 | Keenan | Sept. 17, 1907 |
| 2,461,248 | Wright | Feb. 8, 1949 |